Jan. 12, 1937.   J. BRUIJNES   2,067,691
CATHODE STRUCTURE FOR DISCHARGE DEVICES
Filed Aug. 21, 1934
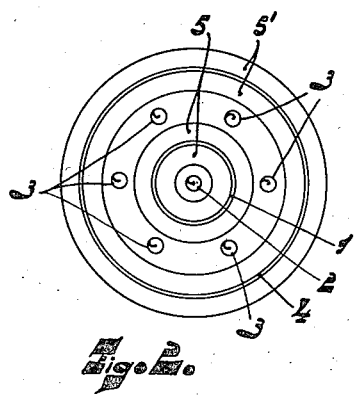
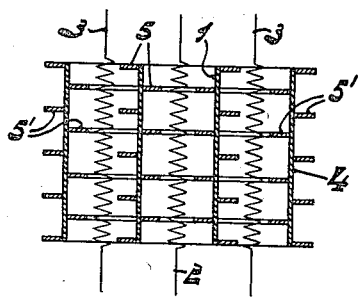
Inventor:
J. Bruijnes,
by _____
Att'y.

Patented Jan. 12, 1937

2,067,691

UNITED STATES PATENT OFFICE 2,067,691

CATHODE STRUCTURE FOR DISCHARGE DEVICES

Johannes Bruijnes, Eindhoven, Netherlands, assignor to N. V. Philips' Gloeilampenfabrieken, Eindhoven, Netherlands Application August 21, 1934, Serial No. 740,837
In Germany September 7, 1933

5 Claims. (Cl. 250—27.5)

My present invention relates to a cathode construction for discharge devices, and especially to a cathode having a large emitting surface as is required to handle large currents. Such a cathode is especially adapted to be used in discharge devices, for instance rectifier tubes, having a gaseous filling, although the invention is not limited to such devices.

In a common form of cathode construction the cathode consists of a body provided with an electron emissive coating, for instance an oxide coating, which is heated by a filamentary heating element to the temperature required for the proper electron emission of the cathode, the body usually being a tubular member which surrounds the heating element.

The disadvantage of such cathode construction is, that the temperature of the emitting cathode surface is different at different portions of the surface, and is considerably higher at the central portion than at the end portions. Thus, to obtain a sufficiently high electron emitting temperature at the ends of the emitting surface of the cathode, the temperature of the heating element has to be considerably higher than that required to bring the central portion of the cathode to the proper electron emitting temperature, and, in fact, requires the heating element to be brought to such a high temperature that it has only a short life. Furthermore, the size of the cathode is also limited as, with increasing size, the temperature drop along the cathode surface correspondingly increases.

According to the invention, in addition to the heating element provided inside of the cathode body, I provide a heating element, or a group of heating elements, outside of the body. Furthermore, I increase the emitting surface of the cathode body by projecting parts, for instance by fins or ribs which preferably extend both inwardly and outwardly from the cathode surface, and as the heating elements are disposed both outside and inside of the cathode body, a very large electron emitting surface can be heated to a temperature which is substantially uniform over the entire surface.

According to a further embodiment of the invention, in addition to placing heating elements both inside and around the cathode body, I provide around the outer heating element or elements a second cathode body, which in its turn can be surrounded by a third heating element or group of heating elements, etc. In this manner a cathode structure can be obtained, the current carrying capacity of which is practically unlimited.

Between the various succeeding members of the cathode sufficient space is provided so that the entire active cathode surface can participate in the discharge.

The invention will be more clearly understood by reference to the accompanying drawing, in which:

Figure 1 is a sectionized view of a cathode construction in accordance with the invention;

Fig. 2 is a top view of Figure 1.

The cylindrical member 1 forms the central cathode body and is provided with fins or ribs 5 extending both inwardly and outwardly. The surface of the cylinder 1 and of its ribs 5 is provided with a suitable electron emitting coating, for instance a barium oxide coating. A heating element 2, for instance a wire, is axially disposed within cylinder 1 and the cylinder is surrounded by a plurality of heating wires 3 (of which only two appear in Fig. 1) which are disposed symmetrically around cylinder 1. The heating wires 3 are surrounded by a second cylindrical body 4, also provided with ribs 5'; the body 4 and the ribs 5' being also coated with a highly electron emissive coating, for instance with barium oxide.

Instead of surrounding the cylinder 1 by a plurality of heating wires 3 it can be surrounded by a single helically wound wire.

The heating wires may be electrically connected in parallel or in series and may also be provided with an electron emitting coating, thus also contributing to the electron emission of the cathode.

While I have described my invention with regard to a specific construction and for a specific application, I do not wish to be limited thereto but desire the appended claims to be construed as broadly as permissible in view of the prior art.

What I claim is:

1. A cathode structure for discharge devices comprising a hollow elongated member provided with fins to substantially increase the free emitting surface of said member and designed to emit electrons both internally and externally, a highly electron emitting coating disposed on said member and said fins, a heating element inside of said member, and a heating element surrounding said body.

2. A cathode structure for discharge devices comprising a large area cathode body, heating elements disposed inside and outside of said cathode body, and a second large area cathode body surrounding said outside heating element, both of said cathode bodies being provided with a highly electron emitting substance.

3. A cathode structure for discharge devices comprising a large area cathode body provided with inwardly and outwardly extending fins, heating elements disposed inside and outside of said cathode body, and a second large area cathode body provided with inwardly and outwardly extending fins and surrounding said outside heating element, both of said cathode bodies being provided on their surface with layers of a highly electron emitting substance.

4. A cathode structure for discharge devices comprising a cylindrical member provided with lateral fins to substantially increase the free emitting surface thereof, a heating element disposed inside of said member, a heating element disposed outside of said member, and a second cylindrical member surrounding said latter heating element and provided with lateral fins to substantially increase the free emitting surface thereof, said cylindrical members, fins and heating elements being provided on their surfaces with layers of high electron emitting capacity and being so spaced relative to each other that substantially their entire surfaces can participate in the discharge.

5. A cathode structure for discharge devices, comprising a large-area hollow cathode body provided on its inner and outer surface with a highly electron-emitting layer and adapted to emit electrons both inwardly and outwardly, a heating element disposed within said body, and a heating element disposed outside said body, said heating elements jointly heating said body to its proper electron-emitting temperature.

JOHANNES BRUIJNES.